US012753804B1

(12) United States Patent
Kee

(10) Patent No.: US 12,753,804 B1
(45) Date of Patent: Oct. 6, 2026

(54) DUAL OIL PUMP WITH CENTRIFUGAL SHIFTER

(71) Applicant: Schaeffler Technologies AG & Co. KG, Herzogenaurach (DE)

(72) Inventor: Noah Kee, Rittman, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/247,757

(22) Filed: Jun. 24, 2025

(51) Int. Cl.

| | |
|---|---|
| ***F16D 11/10*** | (2006.01) |
| ***F04C 2/10*** | (2006.01) |
| ***F04C 11/00*** | (2006.01) |
| ***F04C 14/02*** | (2006.01) |
| ***F04C 15/00*** | (2006.01) |
| ***F04C 15/06*** | (2006.01) |
| ***F16D 11/00*** | (2006.01) |
| ***H02K 7/18*** | (2006.01) |
| ***H02K 9/19*** | (2006.01) |

(52) U.S. Cl.

CPC .............. *F16D 11/10* (2013.01); *F04C 2/102* (2013.01); *F04C 11/001* (2013.01); *F04C 11/008* (2013.01); *F04C 14/02* (2013.01); *F04C 15/0061* (2013.01); *F04C 15/06* (2013.01); *H02K 7/1815* (2013.01); *H02K 9/19* (2013.01); *F04C 2240/60* (2013.01); *F16D 2011/008* (2013.01); *F16D 2500/10462* (2013.01)

(58) Field of Classification Search

CPC ............... F16D 11/10; F16D 2011/008; F16D 2500/10462; F04C 2/102; F04C 11/001; F04C 11/008; F04C 14/02; F04C 15/0061; F04C 15/06; F04C 2240/60; H02K 7/1815; H02K 9/19

See application file for complete search history.

(56) References Cited

U.S. PATENT DOCUMENTS

| | | | | |
|---|---|---|---|---|
| 4,512,728 | A * | 4/1985 | Nakano | F25B 1/04 418/3 |
| 6,612,822 | B2 * | 9/2003 | Buschur | F04C 15/0049 418/21 |
| 8,128,377 | B2 * | 3/2012 | Earhart | F04C 14/226 417/2 |
| 9,599,108 | B2 * | 3/2017 | Khanzode | F04C 14/065 |
| 9,610,842 | B2 * | 4/2017 | Kasuya | F04C 2/102 |
| 11,635,053 | B2 | 4/2023 | Payne et al. | |
| 11,708,789 | B2 | 7/2023 | Payne et al. | |
| 11,933,258 | B2 | 3/2024 | Ramsey et al. | |

(Continued)

*Primary Examiner* — Peter J Bertheaud

(74) *Attorney, Agent, or Firm* — Suiter Swantz IP

(57) ABSTRACT

A dual oil pump may perform centrifugal shifting using a centrifugal mass and spring system that converts centrifugal force into axial movement. The dual oil pump may have centrifugal rollers attached to a pump shaft via single-bar linkages. The centrifugal rollers may roll on a ramped surface of a carrier assembly. There is no relative rotation between the ramped surface and the centrifugal rollers about the center axis of the dual oil pump. As the angular speed of the pump shaft increases, the rollers roll radially outward along the ramps and oppose the spring force provided by a shaft-return spring, opening a dog clutch and disengaging a second mechanical pump. During re-engagement, the reverse happens such that the rollers travel radially inward along the ramps, closing the dog clutch and engaging the second mechanical pump.

20 Claims, 7 Drawing Sheets

(56) References Cited

U.S. PATENT DOCUMENTS

| | | | |
|---|---|---|---|
| 12,088,179 | B2 | 9/2024 | Heeke |
| 2023/0110040 | A1 | 4/2023 | Payne |
| 2024/0048032 | A1 | 2/2024 | Condo et al. |

* cited by examiner

200

300

DUAL OIL PUMP WITH CENTRIFUGAL SHIFTER

TECHNICAL FIELD

The present disclosure generally relates to controlling of coolant flow, and more particularly, to cutting in and out pumps using clutches which are actuated by centrifugal devices.

BACKGROUND

Oil pumps may be demanded to supply first target flow rates at low angular speeds and a second target flow rates at high angular speeds, where the first target flow rates are relatively high and the second target flow rates are tapered off slightly above the first target flow rates. Electrical oil pumps may meet the target flow rates. However, the electrical oil pumps are relatively expensive. Mechanical oil pumps are less expensive than the electrical oil pumps. However, the flow rates provided the mechanical oil pumps are generally linear with respect angular speed and thus meeting the first target flow rate at the first angular speed may cause the flow rate at the high angular speeds to be well above the second target flow rates, thus decreasing the efficiency of the mechanical oil pumps.

SUMMARY

A dual oil pump is described, in accordance with one or more embodiments of the present disclosure. The dual oil pump may include: a housing assembly, the housing assembly defining an inlet and an outlet; a carrier assembly, the carrier assembly being rotatably connected to the housing assembly; a pump shaft, the pump shaft being non-rotatably connected to and configured to axially translate relative to the carrier assembly; a first mechanical pump, the pump shaft being non-rotatably connected to and configured to axially translate relative to the first mechanical pump; a second mechanical pump, the first mechanical pump and the second mechanical pump being radially aligned and axially offset from each other, the first mechanical pump and the second mechanical pump being disposed axially within and radially within the housing assembly, the first mechanical pump and the second mechanical pump being configured to pump oil from the inlet to the outlet via rotation of respective of the first mechanical pump and the second mechanical pump relative to the housing assembly; and a dog clutch, the dog clutch being formed by the pump shaft and the second mechanical pump, the dog clutch being a non-rotatable connection between the pump shaft and the second mechanical pump when closed and permitting relative rotation between the pump shaft and the second mechanical pump when open, the dog clutch being closed and opened by axial translation of the pump shaft relative to the second mechanical pump, the pump shaft being configured to axially translate relative to the housing assembly, the carrier assembly, the first mechanical pump, and the second mechanical pump via centrifugal shifting caused by rotation of the carrier assembly and the pump shaft about a center axis.

In some aspects, the housing assembly is formed of a back housing, an intermediate housing, and a front housing, wherein the back housing, the intermediate housing, and the front housing are radially aligned, wherein the intermediate housing is axially disposed between the back housing and the front housing, wherein the intermediate housing defines the inlet and the outlet, wherein the first mechanical pump is disposed axially between the front housing and the intermediate housing, wherein the second mechanical pump is disposed axially between the intermediate housing and the back housing.

In some aspects, the carrier assembly is formed of a bearing carrier and a pump drive, wherein the bearing carrier and the pump drive are radially aligned and affixed together, wherein the dual oil pump includes a radial bearing, wherein the bearing carrier of the carrier assembly is rotatably connected to the front housing of the housing assembly via the radial bearing, wherein a shaft-to-carrier prismatic joint is formed between the pump shaft and the pump drive.

In some aspects, the inlet and the outlet split between the first mechanical pump and the second mechanical pump, wherein the dual oil pump includes a check valve, wherein the check valve is coupled along the inlet to the second mechanical pump.

In some aspects, the first mechanical pump and the second mechanical pump are at least one of gear pumps or rotary lobe pumps.

In some aspects, the first mechanical pump and the second mechanical pump are the gear pumps, wherein the first mechanical pump and the second mechanical pump are at least one of external gear pumps or internal gear pumps.

In some aspects, the first mechanical pump and the second mechanical pump are the internal gear pumps, wherein the first mechanical pump and the second mechanical pump include inner gears and outer gears, wherein the inner gears are axially aligned with and disposed radially inwards of the outer gears, wherein the inner gears mesh with the outer gears, wherein the inner gears and the outer gears are configured to rotate relative to the housing assembly, wherein a shaft-to-pump prismatic joint is formed between the pump shaft and the inner gear of the first mechanical pump, wherein the dog clutch is formed by dog teeth disposed on an axial end of the pump shaft and disposed on the inner gear of the second mechanical pump.

In some aspects, the carrier assembly defines a ramped surface, wherein the ramped surface increases radially away from the center axis when the ramped surface is further axially from the housing assembly, wherein the dual oil pump includes: a centrifugal roller, wherein the ramped surface is disposed radially outwards of and axially aligned with the centrifugal roller, wherein the centrifugal roller is configured to abut with and roll on the ramped surface; and a single-bar linkage, wherein the single-bar linkage couples between the pump shaft and the centrifugal roller.

In some aspects, the centrifugal roller is one of a plurality of centrifugal rollers, wherein the single-bar linkage is one of a plurality of single-bar linkages.

In some aspects, the single-bar linkage is coupled to and configured to rotate relative to the pump shaft perpendicular to the center axis, wherein the centrifugal roller is coupled to and configured to rotate relative to the single-bar linkage perpendicular to the center axis, wherein the pump shaft and the centrifugal roller are coupled to opposing ends of the single-bar linkage.

In some aspects, rotation of the pump shaft about the center axis causes the centrifugal roller to translate radially up to and in abutment with the ramped surface via centrifugal force, wherein the centrifugal roller is configured to roll along the ramped surface by rotating relative to the single-bar linkage as the single-bar linkage rotates relative to the pump shaft and the pump shaft translates axially.

In some aspects, the ramped surface includes one of a convex slope, a linear slope, or a concave slope.

In some aspects, the centrifugal roller does not rotate relative to the ramped surface about the center axis.

In some aspects, the dual oil pump includes a shaft-return spring, wherein the dog clutch is normally-closed by the shaft-return spring, wherein the shaft-return spring is coupled between the carrier assembly and the pump shaft.

In some aspects, the pump shaft includes a shoulder portion, wherein the shaft-return spring is coupled between a pump drive of the carrier assembly and the shoulder portion of the pump shaft, wherein the single-bar linkage is coupled to the shoulder portion.

In some aspects, the dual oil pump is configured to synchronize the second mechanical pump to an angular speed of the pump shaft before the dog clutch is closed.

In some aspects, the dual oil pump includes a synchronizer, wherein the synchronizer is disposed radially inwards of and axially aligned with the dog clutch, wherein the synchronizer is non-rotatably connected to and configured to axially translate relative to the pump shaft, wherein the synchronizer is configured to synchronize the second mechanical pump to the angular speed of the pump shaft; and a synchro-return spring, wherein the synchronizer is normally-closed by the synchro-return spring, wherein the synchro-return spring is coupled between the pump shaft and the synchronizer.

A dynamo-electric machine is described, in accordance with one or more embodiments of the present disclosure. The dynamo-electric machine may include: a dual oil pump including: a housing assembly, the housing assembly defining an inlet and an outlet; a carrier assembly, the carrier assembly being rotatably connected to the housing assembly; a pump shaft, the pump shaft being non-rotatably connected to and configured to axially translate relative to the carrier assembly; a first mechanical pump, the pump shaft being non-rotatably connected to and configured to axially translate relative to the first mechanical pump; a second mechanical pump, the first mechanical pump and the second mechanical pump being radially aligned and axially offset from each other, the first mechanical pump and the second mechanical pump being disposed axially within and radially within the housing assembly, the first mechanical pump and the second mechanical pump being configured to pump oil from the inlet to the outlet via rotation of respective of the first mechanical pump and the second mechanical pump relative to the housing assembly; and a dog clutch, the dog clutch being formed by the pump shaft and the second mechanical pump, the dog clutch being a non-rotatable connection between the pump shaft and the second mechanical pump when closed and permitting relative rotation between the pump shaft and the second mechanical pump when open, the dog clutch being closed and opened by axial translation of the pump shaft relative to the second mechanical pump, the pump shaft being configured to axially translate relative to the housing assembly, the carrier assembly, the first mechanical pump, and the second mechanical pump via centrifugal shifting caused by rotation of the carrier assembly and the pump shaft about a center axis; a rotor; a stator, the rotor and the stator forming an outer-rotor, inner-stator radial flux machine; an input shaft; and a rotor carrier, the rotor, the input shaft, the rotor carrier, and the carrier assembly forming a rigid body.

In some aspects, the dynamo-electric machine is configured as a generator, wherein the generator drives the rotation of the rotor via the input shaft and the rotor carrier, wherein the generator drives the rotation of the pump shaft via the input shaft, the rotor carrier, and the carrier assembly.

In some aspects, the dynamo-electric machine is configured as a motor, wherein the motor drives the input shaft via the rotor and the rotor carrier, wherein the motor drives the rotation of the pump shaft via the rotor, the rotor carrier, and the carrier assembly.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
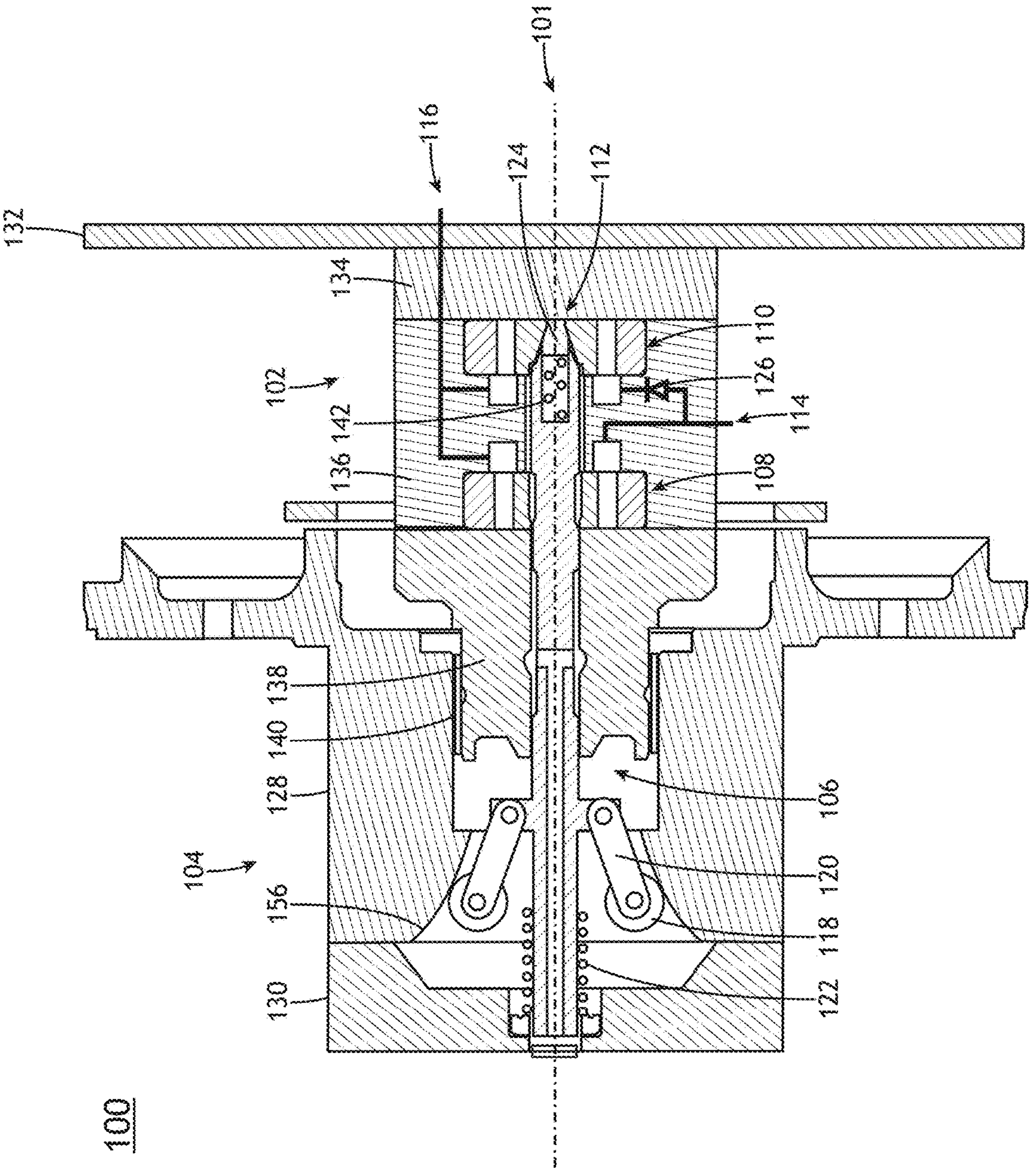
FIG. 1A illustrates a cross-section view along a center axis of a dual oil pump configured in a clutch-closed stage, in accordance with one or more embodiments of the present disclosure.
Figure 1B:
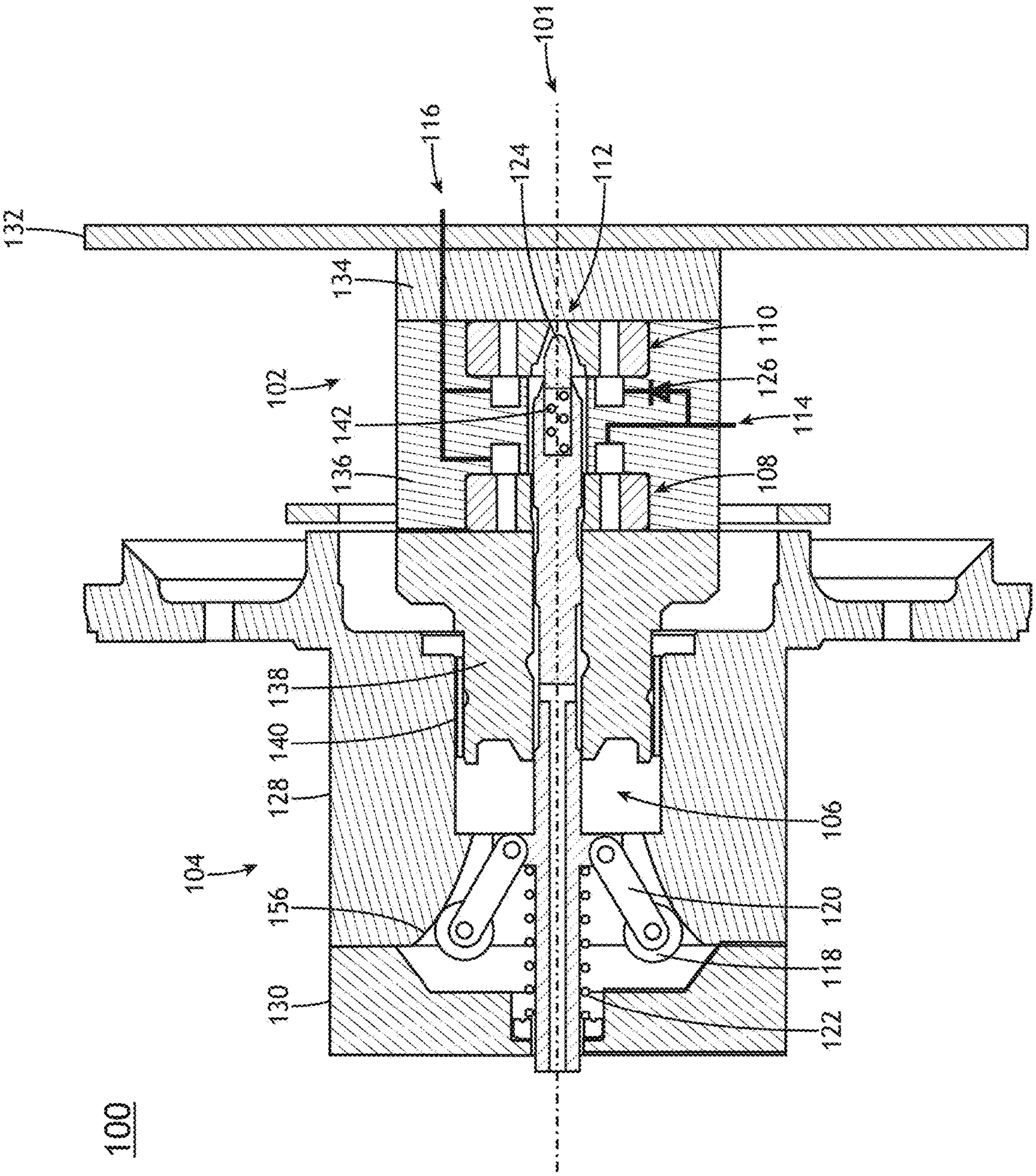
FIG. 1B illustrates a cross-section view along the center axis of the dual oil pump configured in a synchro-closed stage, in accordance with one or more embodiments of the present disclosure.
Figure 1C:
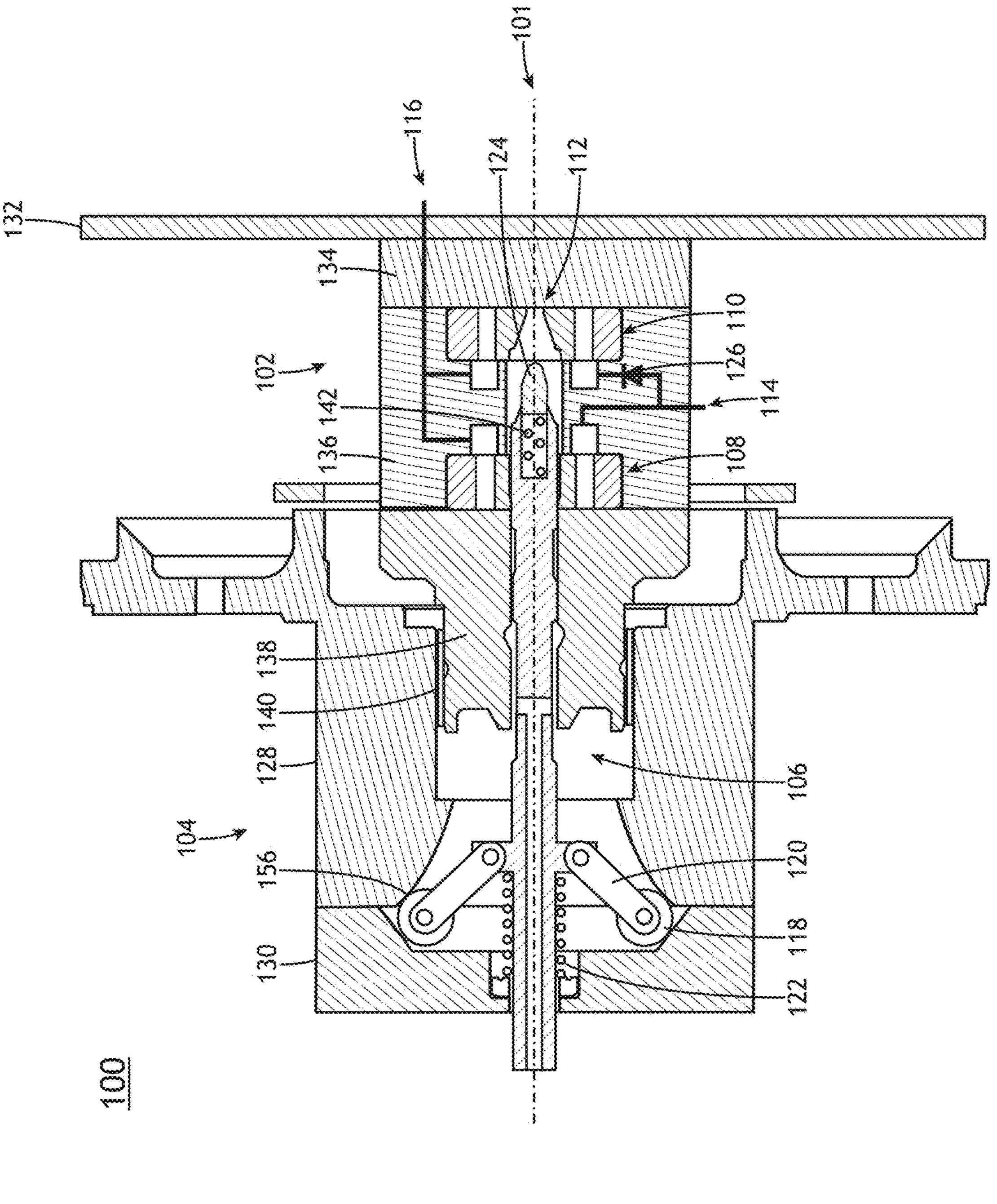
FIG. 1C illustrates a cross-section view along the center axis of the dual oil pump configured in a clutch-open stage, in accordance with one or more embodiments of the present disclosure.
Figure 1D:
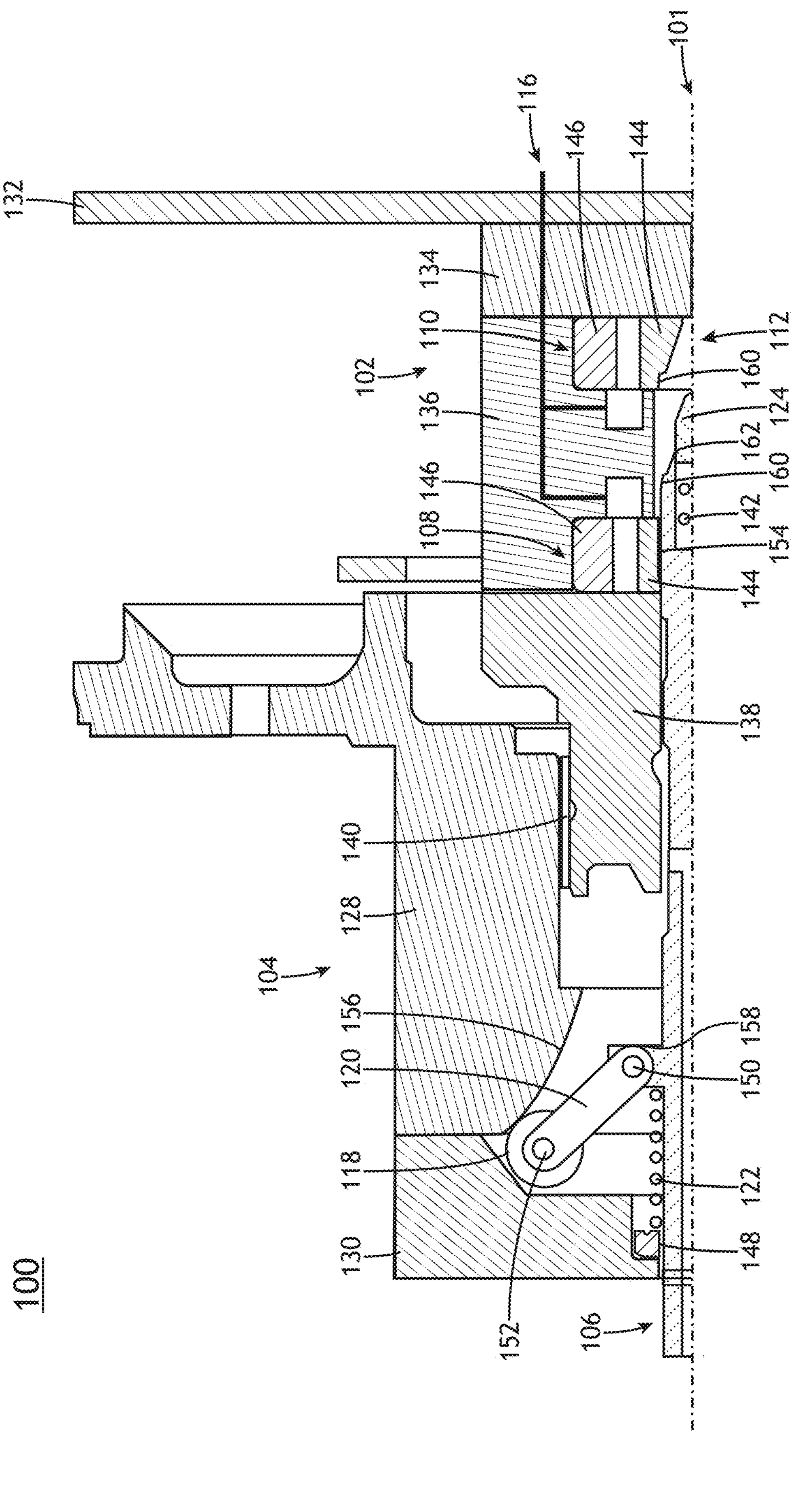
FIG. 1D illustrates a partial view taken from FIG. 1C to more clearly illustrate the components of the dual oil pump, in accordance with one or more embodiments of the present disclosure.
Figure 1E:
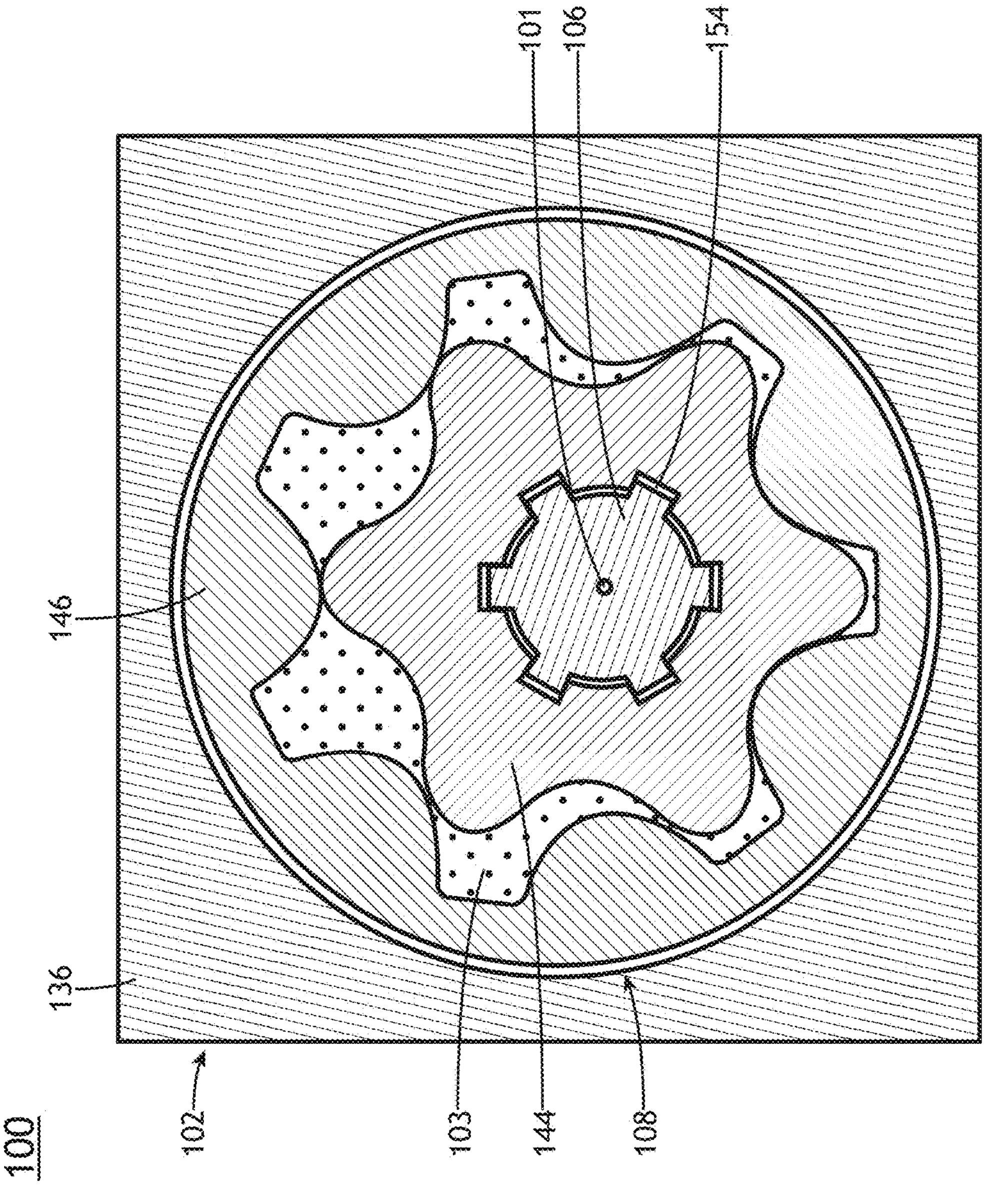
FIG. 1E illustrates a cross-section view through a radial width of a mechanical pump of the dual oil pump, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a dual oil pump with a centrifugal shifter. The dual oil pump may perform centrifugal shifting using a centrifugal mass and spring system that converts centrifugal force into axial movement. The dual oil pump may have centrifugal rollers attached to a pump shaft via single-bar linkages. The centrifugal rollers may roll on a ramped surface of a carrier assembly. There is no relative rotation between the ramped surface and the centrifugal rollers about the center axis of the dual oil pump. As the angular speed of the pump shaft increases, the rollers roll radially outward along the ramps and oppose the axial force provided by a shaft-return spring, opening a dog clutch and disengaging a second mechanical pump. During re-engagement, the reverse happens such that the rollers travel radially inward along the ramps, closing the dog clutch and engaging the second mechanical pump.

FIGS. 1A-1E illustrate a dual oil pump 100, in accordance with one or more embodiments of the present disclosure. The dual oil pump 100 may be a dual oil pump with centrifugal shifter. The dual oil pump 100 may include one or more components, such as, but not limited to, a housing assembly 102, a carrier assembly 104, a pump shaft 106, a first mechanical pump 108, a second mechanical pump 110, a dog clutch 112, an inlet 114, an outlet 116, centrifugal rollers 118, single-bar linkages 120, a shaft-return spring 122, a synchronizer 124 (synchro), a check valve 126, bearing carrier 128, a pump drive 130, a system housing 132, a back housing 134, an intermediate housing 136, a front housing 138, a radial bearing 140, a synchro-return spring 142, inner gears 144, and/or outer gears 146.

The dual oil pump 100 may define a center axis 101 to which one or more of the components may be concentric and/or about which one or more of the components may rotate.

The housing assembly 102 may be formed of one or more components. For example, the housing assembly 102 may be formed of the system housing 132, the back housing 134, the intermediate housing 136, and/or the front housing 138. The system housing 132, the back housing 134, the intermediate housing 136, and/or the front housing 138 may be radially aligned. The system housing 132 and the front housing 138 may be disposed at opposing axial ends of the housing assembly 102. The back housing 134 may be axially disposed between the system housing 132 and the intermediate housing 136. The intermediate housing 136 may be axially disposed between the back housing 134 and the front housing 138. The system housing 132, the back housing 134, the intermediate housing 136, and/or the front housing 138 may be affixed together. For example, the system housing 132, the back housing 134, the intermediate housing 136, and/or the front housing 138 may be affixed together by fasteners, staking (e.g., plastically deforming the material of said components), or the like.

The housing assembly 102 may define the inlet 114 and/or the outlet 116. For example, the intermediate housing 136 may define the inlet 114. The inlet 114 may be defined radially through the intermediate housing 136. By way of another example, the intermediate housing 136, the back housing 134, and the system housing 132 may cooperatively define the outlet 116. The outlet 116 may be defined radially and axially through a portion of the intermediate housing 136 and may be defined axially through the entirety of the back housing 134 and the system housing 132.

The carrier assembly 104 may be formed of one or more components. For example, the carrier assembly 104 may be formed of the bearing carrier 128 and/or the pump drive 130. The bearing carrier 128 and the pump drive 130 may be radially aligned and affixed together. For example, the bearing carrier 128 and/or the pump drive 130 may be affixed together by fasteners, staking (e.g., plastically deforming the material of said components), or the like. Forming the carrier assembly 104 of the bearing carrier 128 and the pump drive 130 may be beneficial for ease-of-assembly of one or more components of the dual oil pump 100 which are disposed radially inwards of and axially aligned with the carrier assembly 104. Although the bearing carrier 128 and the pump drive 130 are described as being affixed together, this is not intended as a limitation of the present disclosure. The bearing carrier 128 and the pump drive 130 may be formed as a monolithic unit.

The carrier assembly 104 may be rotatably connected to the housing assembly 102. The carrier assembly 104 may be configured to rotate relative to the housing assembly 102 about the center axis 101 via the rotatable connection. For example, the bearing carrier 128 and the pump drive 130 may be concentric to the center axis 101 and configured to rotate relative to the housing assembly 102 about the center axis 101. The carrier assembly 104 may be radially constrained to the housing assembly 102. The radial constraint may prevent relative radial translation between the housing assembly 102 and the carrier assembly 104 and may allow rotation of the carrier assembly 104 relative to the housing assembly 102 about the center axis 101. The carrier assembly 104 may rotatably connecting and/or radially constrained to the housing assembly 102 via the radial bearing 140. For example, the bearing carrier 128 of the carrier assembly 104 may be radially constrained to the front housing 138 of the housing assembly 102. For instance, an outer diameter and an inner diameter of the radial bearing 140 may abut to respective of the bearing carrier 128 and/or the front housing 138. The radial bearing 140 may be concentric to the center axis 101. The radial bearing 140 may or may not prevent relative axial translation therebetween. For example, the radial bearing 140 may form a revolute joint or a cylindrical joint between the carrier assembly 104 and the housing assembly 102.

The pump shaft 106 may be non-rotatably connected to and configured to axially translate relative to the carrier assembly 104. For example, the pump shaft 106 may be radially constrained, circumferentially constrained, and axially unconstrained to the carrier assembly 104. The radial constraint may prevent relative radial translation, the circumferential constraint may prevent relative rotation, and the axial unconstraint may allow the relative axial translation between the pump shaft 106 and the carrier assembly 104. The pump shaft 106 and the carrier assembly 104 may be connected by a shaft-to-carrier prismatic joint 148. The shaft-to-carrier prismatic joint 148 may permit the pump shaft 106 to axially translate relative to the carrier assembly 104 but may permit no other relative translation or relative rotation. For example, the shaft-to-carrier prismatic joint 148 may be formed between the pump shaft 106 and the pump drive 130 of the carrier assembly 104. The shaft-to-carrier prismatic joint 148 may transmit torque between the pump shaft 106 and the carrier assembly 104. Torque is transmitted from the carrier assembly 104 to the pump shaft 106 without going through the shaft-return spring 122, to prevent the shaft-return spring 122 from wear out by rubbing.

The first mechanical pump 108 and the second mechanical pump 110 may be disposed axially within and radially within the housing assembly 102. The first mechanical pump

108 and the second mechanical pump 110 may be disposed in cavities defined by the housing assembly 102. For example, the first mechanical pump 108 and the second mechanical pump 110 may be disposed in cavities defined by the intermediate housing 136 of the housing assembly 102. The first mechanical pump 108 may be disposed axially between the front housing 138 and the intermediate housing 136. The second mechanical pump 110 may be disposed axially between the intermediate housing 136 and the back housing 134. Forming the housing assembly 102 from the system housing 132, the back housing 134, the intermediate housing 136, and/or the front housing 138 may be beneficial for ease-of-manufacturing and/or ease-of-assembly of the dual oil pump 100. For example, the first mechanical pump 108 and/or the second mechanical pump 110 may be inserted into the cavities defined by the intermediate housing 136 before the back housing 134, the intermediate housing 136, and the front housing 138 are affixed together.

The first mechanical pump 108 and the second mechanical pump 110 may be radially aligned and axially offset from each other. For example, the first mechanical pump 108 may be disposed axially between the second mechanical pump 110 and the front housing 138. By way of another example, the second mechanical pump 110 may be disposed axially between the first mechanical pump 108 and the back housing 134.

The dual oil pump 100 may be configured to pump the oil 103 from the inlet 114 to the outlet 116. The first mechanical pump 108 and the second mechanical pump 110 may be configured to pump the oil 103 from the inlet 114 to the outlet 116. The inlet 114 and the outlet 116 may each split between the first mechanical pump 108 and the second mechanical pump 110. For example, the inlet 114 split before the first mechanical pump 108 and the second mechanical pump 110. By way of another example, the outlet 116 may split after the first mechanical pump 108 and the second mechanical pump 110.

The dual oil pump 100 may pump the oil 103 by the rotation of the first mechanical pump 108 and the second mechanical pump 110. The first mechanical pump 108 and the second mechanical pump 110 may be configured to pump the oil 103 from the inlet 114 to the outlet 116 via rotation of the first mechanical pump 108 and the second mechanical pump 110 relative to the housing assembly 102. The first mechanical pump 108 and the second mechanical pump 110 may be rotary-type positive displacement pumps. The first mechanical pump 108 and the second mechanical pump 110 may include any suitable type of rotary-type positive displacement pumps, such as, but not limited to, gear pumps, rotary lobe pumps, or the like. In embodiments, the first mechanical pump 108 and the second mechanical pump 110 are the gear pumps. The gear pumps may be external gear pumps or internal gear pumps (e.g., gerotor pumps).

In embodiments, the first mechanical pump 108 and the second mechanical pump 110 are the gerotor pumps. The gerotor pumps may include the inner gears 144 and the outer gears 146. Each of the first mechanical pump 108 and the second mechanical pump 110 may include one of the inner gears 144 and one of the outer gears 146. The inner gears 144 may be axially aligned with and disposed radially inwards of the outer gears 146. The inner gears 144 may be concentric to and configured to rotate about the center axis 101. The inner gears 144 may mesh with the outer gears 146, causing the outer gears 146 to be driven by the rotation of the inner gears 144. A center axis about which the outer gears 146 may rotate may be radially offset from the center axis 101.

The first mechanical pump 108 and the second mechanical pump 110 may be configured to rotate relative to the housing assembly 102. For example, the inner gears 144 and the outer gears 146 of each of the first mechanical pump 108 and the second mechanical pump 110 may be configured to rotate relative to the housing assembly 102. The first mechanical pump 108 and the second mechanical pump 110 may be radially constrained and axially constrained to the housing assembly 102. The radial constraint may prevent relative radial translation between respective of the first mechanical pump 108 and the second mechanical pump 110 and the housing assembly 102. The axial constraint may prevent relative axial translation between respective of the first mechanical pump 108 and the second mechanical pump 110 and the housing assembly 102. For example, the inner gears 144 of each of the first mechanical pump 108 and the second mechanical pump 110 may be axially constrained to the housing assembly 102. By way of another example, the outer gears 146 of each of the first mechanical pump 108 and the second mechanical pump 110 may be radially constrained and axially constrained to the housing assembly 102. The inner gears 144 and the outer gears 146 may be constrained to the housing assembly 102 by the walls of the housing assembly 102 defining the cavities in which the first mechanical pump 108 and the second mechanical pump 110 are disposed.

The inlet 114 to the first mechanical pump 108 and the second mechanical pump 110 may be disposed radially between the inner gears 144 and the outer gears 146. Similarly, the outlet 116 from the first mechanical pump 108 and the second mechanical pump 110 may be disposed radially between the inner gears 144 and the outer gears 146. The rotation of the inner gears 144 and the outer gears 146 may pump the oil 103 from the inlet 114 to the outlet 116.

The first mechanical pump 108 and the second mechanical pump 110 may be driven by the pump shaft 106, as will be described further herein.

The pump shaft 106 may be non-rotatably connected to and configured to axially translate relative to the first mechanical pump 108. For example, the pump shaft 106 may be radially constrained, circumferentially constrained, and axially unconstrained to the first mechanical pump 108. The pump shaft 106 and the first mechanical pump 108 may be connected by a shaft-to-pump prismatic joint 154. The shaft-to-pump prismatic joint 154 may permit the pump shaft 106 to axially translate relative to the first mechanical pump 108 but may permit no other relative translation or relative rotation. For example, the shaft-to-pump prismatic joint 154 may be formed between the pump shaft 106 and the inner gears 144 of the first mechanical pump 108. For instance, the pump shaft 106 may be disposed radially inwards of and axially aligned with the inner gears 144 of the first mechanical pump 108 to form the shaft-to-pump prismatic joint 154.

The dog clutch 112 may be formed by the pump shaft 106 and the second mechanical pump 110. For example, the dog clutch 112 may be formed by dog teeth 160 disposed on an axial end of the pump shaft 106 and disposed on the inner gears 144 of the second mechanical pump 110. The dog teeth 160 disposed on an axial end of the pump shaft 106 may mesh with the dog teeth 160 disposed on the inner gears 144 of the second mechanical pump 110. The dog clutch 112 may be a closeable and openable coupling between the pump shaft 106 and the second mechanical pump 110. The dog clutch 112 may couple and uncouple the pump shaft 106 and the second mechanical pump 110 when the dog clutch 112 is respectively closed and opened. Closed may also be referred to locked, engaged, or the like. Open may also be referred to as unlocked, disengaged, released, or the like. The dog clutch 112 may be a non-rotatable connection between the pump shaft 106 and the second mechanical pump 110 when closed and permit relative rotation between the pump shaft 106 and the second mechanical pump 110 when open.

The dual oil pump 100 may include a clutch-closed stage 202 in which the both the first mechanical pump 108 and the second mechanical pump 110 are driven and a clutch-open stage 204 in which the first mechanical pump 108 is driven and the second mechanical pump 110 is undriven. The first mechanical pump 108 and the second mechanical pump 110 may pump the oil 103 in parallel when the dog clutch 112 is closed. The dual oil pump 100 may drive the rotation of the first mechanical pump 108 by the pump shaft 106 and the carrier assembly 104 regardless of whether the dog clutch 112 is open or closed. The first mechanical pump 108 may be driven at the same angular speed as the pump shaft 106 and the carrier assembly 104. The dual oil pump 100 may drive the rotation of the second mechanical pump 110 by the dog clutch 112, the pump shaft 106, and the carrier assembly 104 when the dog clutch 112 is closed. The dog clutch 112 may be a non-slip clutch such that the second mechanical pump 110 may be driven at the same angular speed as the dog clutch 112, the pump shaft 106, and the carrier assembly 104. The second mechanical pump 110 may be undriven by the dog clutch 112 when the dog clutch 112 is open.

The dual oil pump 100 may include a mechanical clutch-actuation arranged outside the dog clutch 112. The mechanical clutch-actuation for the dog clutch 112 may be provided by the axial translation of the pump shaft 106. The dog clutch 112 may be closed and opened by the axial translation of the pump shaft 106 translate relative to the second mechanical pump 110. For example, the pump shaft 106 may be axially translated towards and away from the second mechanical pump 110 to respectively close and open the dog clutch 112. The pump shaft 106 may be configured to axially translate relative to the housing assembly 102, the carrier assembly 104, the first mechanical pump 108, and/or the second mechanical pump 110 when providing the mechanical clutch-actuation.

The axial translation of the pump shaft 106 relative to the housing assembly 102, the carrier assembly 104, the first mechanical pump 108, and/or the second mechanical pump 110 may be caused by centrifugal shifting. The axial translation of the pump shaft 106 may be based on the angular speed of the pump shaft 106. For example, the axial translation of the pump shaft 106 may be provided by rotation of the pump shaft 106, couplings between the pump shaft 106, the single-bar linkages 120, and the centrifugal rollers 118, abutment between the centrifugal rollers 118 and the ramped surface 156, and/or couplings between the pump shaft 106, the shaft-return spring 122, and the carrier assembly 104. The carrier assembly 104, the pump shaft 106, the single-bar linkages 120, the centrifugal rollers 118, the ramped surface 156, and the shaft-return spring 122 may turn the centrifugal force into axial movement that operates as a function of the angular speed.

The pump shaft 106 may be a carrier for the centrifugal rollers 118 and the single-bar linkages 120. The pump shaft 106 may carry the centrifugal rollers 118 and the single-bar linkages 120 with the pump shaft 106 as the pump shaft 106 axially translates relative to the housing assembly 102, the carrier assembly 104, the first mechanical pump 108, and/or the second mechanical pump 110.

The pump shaft 106 may include a shoulder portion 158. The shoulder portion 158 may extend radially outward from a main shaft body of the pump shaft 106. The shoulder portion 158 may be used for one or more purposes, such as providing a backstop for the shaft-return spring 122 and/or for coupling with the single-bar linkages 120.

The dog clutch 112 may be normally-closed by the shaft-return spring 122. The shaft-return spring 122 may be coupled between the carrier assembly 104 and the pump shaft 106. For example, the shaft-return spring 122 may be coupled between the pump drive 130 of the carrier assembly 104 and the shoulder portion 158 of the pump shaft 106. The shaft-return spring 122 may be a compression spring. The shaft-return spring 122 may exhibit axial force attempting to resist compression forcing the pump shaft 106 towards the second mechanical pump 110 and keeping the dog clutch 112 normally-closed. The axial translation of the pump shaft 106 due to the centrifugal force may overcome the axial force of the shaft-return spring 122 and further compress the shaft-return spring 122, forcing the dual oil pump 100 from the clutch-closed stage 202 into the clutch-open stage 204. When the centrifugal force is reduced, the shaft-return spring 122 may cause the pump shaft 106 to translate towards the second mechanical pump 110 and close the dog clutch 112. In this regard, the shaft-return spring 122 may also be considered a dog-clutch-return spring.

The single-bar linkages 120 may rigid members formed as a single-bar. The single-bar linkages 120 may also be referred to as rods, links, or the like. The use of the single-bar linkages 120 may be beneficial, as compared to an elastic member (e.g., a string or the like), to prevent the centrifugal rollers 118 and/or the single-bar linkages 120 from interacting with others of the centrifugal rollers 118 and/or the single-bar linkages 120.

The single-bar linkages 120 may be coupled to and configured to rotate relative to the pump shaft 106 perpendicular to the center axis 101. The single-bar linkages 120 may be coupled to any suitable portion of the pump shaft 106. For example, the single-bar linkages 120 may be coupled to the shoulder portion 158 of the pump shaft 106. The pump shaft 106 and the single-bar linkages 120 may be coupled by shaft-to-linkage revolute joints 150 which may permit the relative rotation and may prevent axial translation.

The centrifugal rollers 118 may be coupled to and configured to rotate relative to respective of the single-bar linkages 120 perpendicular to the center axis 101. The axis about which the centrifugal rollers 118 rotates relative to the single-bar linkages 120 may be parallel to the axis about which the single-bar linkages 120 rotate relative to the pump shaft 106. The centrifugal rollers 118 and the single-bar linkages 120 may be coupled by roller-to-linkage revolute joints 152 which may permit the relative rotation and may prevent axial translation.

The dual oil pump 100 may include at least one of the centrifugal rollers 118. For example, the dual oil pump 100 may include one, two, three, or more of the centrifugal rollers 118. Each of the centrifugal rollers 118 may be coupled to the pump shaft 106 by a respective one of the single-bar linkages 120. The single-bar linkages 120 may couple between the pump shaft 106 and respective of the centrifugal rollers 118. The pump shaft 106 and the centrifugal rollers 118 may be coupled to opposing ends of the single-bar linkages 120. In this regard, the pump shaft 106, the single-bar linkages 120, and the centrifugal rollers 118 may form a kinematic chain. The centrifugal rollers 118 may radially translate and axially translate relative to the pump shaft 106 by the kinematic chain. For example, the centrifugal rollers 118 may radially translate and axially translate relative to the pump shaft 106 by rotating the single-bar linkages 120 relative to the pump shaft 106.

The carrier assembly 104 may define the ramped surface 156. The ramped surface 156 may also be referred to as a cam. The ramped surface 156 may be defined by any suitable portion of the carrier assembly 104. For example, the bearing carrier 128 of the carrier assembly 104 may define the ramped surface 156. The ramped surface 156 may be disposed radially outwards of and axially aligned with the centrifugal rollers 118.

The ramped surface 156 may increase radially away from the center axis 101 the further axially the ramped surface 156 is from the housing assembly 102. The ramped surface 156 may include any suitable slope which increases radially away, such as a convex slope (as depicted), a linear slope, a concave slope, or the like. In embodiments, the slope is the convex slope. The slope may be selected to balance a mechanical advantage provided by the ramped surface 156 when abutting with the centrifugal rollers 118 against a space requirement for the dual oil pump 100.

The centrifugal rollers 118 may abut the ramped surface 156. For example, the centrifugal rollers 118 may abut the ramped surface 156 when a rotation of the pump shaft 106 about the center axis 101 causes the centrifugal rollers 118 to translate radially up to and in abutment with the ramped surface 156 via the centrifugal force. The centrifugal rollers 118 may or may not abut the ramped surface 156 when the pump shaft 106 is not rotating about the center axis 101. The abutment between the centrifugal rollers 118 and the ramped surface 156 may provide an axial force which may overcome the axial force from the shaft-return spring 122 and axially translate pump shaft 106.

The centrifugal rollers 118 may also be configured to roll along the ramped surface 156. The centrifugal rollers 118 may roll along the ramped surface 156 by rotating relative to the single-bar linkages 120 as the single-bar linkages 120 rotate relative to the pump shaft 106 and the pump shaft 106 translates axially. The centrifugal rollers 118 may roll by rotating about the axis perpendicular to the center axis 101. Notably, the centrifugal rollers 118 do not rotate relative to the ramped surface 156 about the center axis 101. Instead, the centrifugal rollers 118 are non-rotatably connected to the ramped surface 156 via the shaft-to-carrier prismatic joint 148, the pump shaft 106, and the single-bar linkages 120. For example, the carrier assembly 104, the pump shaft 106, the single-bar linkages 120, and the centrifugal rollers 118 may each rotate together at a same angular speed about the center axis 101.

Thus, the centrifugal shifting may be accomplished by using a centrifugal mass and spring system that can convert centrifugal force into axial movement. As the angular speed of the pump shaft 106 increases, the centrifugal rollers 118 may roll radially outward along the ramped surface 156 and oppose the axial force provided by a shaft-return spring 122, axially translating the pump shaft 106 away from the second mechanical pump 110, opening the dog clutch 112, and disengaging the second mechanical pump 110. As the angular speed of the pump shaft 106 decreases, the reverse may happen such that the centrifugal rollers 118 travel radially inward along the ramped surface 156, axially translating the pump shaft 106 towards the second mechanical pump 110, closing the dog clutch 112, and engaging the second mechanical pump.

When axially translating via the rotation, the pump shaft 106 may be axially stopped when the shaft-return spring 122 is compressed fully and/or the pump drive 130 stops the centrifugal rollers 118. The pump shaft 106 may also be axially stopped in the opposing direction when the dog clutch 112 is closed.

The check valve 126 may also be referred to as a backflow-preventer valve. The check valve 126 may be disposed within the housing assembly 102. For example, the check valve 126 may be disposed within the intermediate housing 136 of the housing assembly 102. The check valve 126 may be coupled along the inlet 114 to the second mechanical pump 110. The check valve 126 may permit the flow of the oil 103 from the inlet 114 to the second mechanical pump 110 and prevent the backflow of the oil 103 and/or air from the second mechanical pump 110 to the inlet 114 and/or to the first mechanical pump 108. When the second mechanical pump 110 is disengaged, the check valve 126 may prevent the first mechanical pump 108 from pumping the oil 103 and/or air from the second mechanical pump 110.

The dual oil pump 100 may also be configured to synchronize the second mechanical pump 110 to the angular speed of the pump shaft 106 before the dog clutch 112 is closed. The synchronizer 124 may synchronize the second mechanical pump 110 to the angular speed of the pump shaft 106. The synchronizer 124 may be a pressure ring, a friction plates, friction cones, or another axially-movable friction surfaces.

The synchronizer 124 may be a closeable and openable coupling between the pump shaft 106 and the second mechanical pump 110. The synchronizer 124 may couple and uncouple the pump shaft 106 and the second mechanical pump 110 when the synchronizer 124 is respectively closed and opened. The synchronizer 124 may be a slip connection when closed using friction between the pump shaft 106 and the second mechanical pump 110, thereby transferring some torque while permitting relative rotation. The slipping may permit synchronization of the second mechanical pump 110 to the angular speed of the pump shaft 106. The synchronizer 124 may also permit relative rotation between the pump shaft 106 and the second mechanical pump 110 when open.

The synchronizer 124 may be disposed radially inwards of and axially aligned with the dog clutch 112. For example, the synchronizer 124 may be disposed radially inwards of and axially aligned with the dog teeth 160 of the pump shaft 106.

The synchronizer 124 may be non-rotatably connected to and configured to axially translate relative to the pump shaft 106. For example, the synchronizer 124 may be radially constrained, circumferentially constrained, and axially unconstrained to the pump shaft 106. The pump shaft 106 and the synchronizer 124 may be connected by a shaft-to-sychro prismatic joint 162. The shaft-to-sychro prismatic joint 162 may transmit torque between the pump shaft 106 and the synchronizer 124. Torque is transmitted from the pump shaft 106 to the synchronizer 124 without going through the synchro-return spring 142, to prevent the synchro-return spring 142 from wear out by rubbing.

The synchronizer 124 may be normally-closed by the synchro-return spring 142. The synchro-return spring 142 may be coupled between the pump shaft 106 and the synchronizer 124. For example, the synchro-return spring 142 may be coupled within a cavity defined by the pump shaft 106. The synchro-return spring 142 may be a compression spring. The synchro-return spring 142 may exhibit an axial force attempting to resist compression, forcing the synchronizer 124 towards the second mechanical pump 110, and keeping the synchronizer 124 normally-closed. The axial translation of the pump shaft 106 due to the shaft-return spring 122 may overcome the axial force of the synchro-return spring 142 and further compress the synchro-return spring 142, thereby closing the synchronizer 124. When the centrifugal force causes the axial translation of the pump shaft 106 away from the second mechanical pump 110, the synchro-return spring 142 may extend and keep the synchronizer 124 closed. The synchro-return spring 142 may keep the synchronizer 124 closed until the synchro-return spring 142 is fully extended. After the synchro-return spring 142 is fully extended and the centrifugal force causes the axial translation of the pump shaft 106 further away from the second mechanical pump 110, the synchronizer 124 is opened. The amount of travel of the synchro-return spring 142 may be selected based on the desired frictional force between the synchronizer 124 and the second mechanical pump 110.

The dual oil pump 100 may also include a synchro stage 203 in which the second mechanical pump 110 is driven at a smaller angular speed than the first mechanical pump 108. Driving the second mechanical pump 110 at the smaller angular speed than the first mechanical pump 108 may be for synchronizing the second mechanical pump 110 to the first mechanical pump 108 angular speed up to the clutch-closed stage 202. The synchro stage 203 may be in addition to the clutch-closed stage 202 and the clutch-open stage 204. The synchro stage 203 may also be referred to as a clutch-open, synchro-closed stage. The clutch-open stage 204 may also be referred to as a clutch-open, synchro-open stage. The synchronizer 124 may bring the first mechanical pump 108 up to the angular speed of the pump shaft 106 between the clutch-open stage 204 and the clutch-closed stage 202.

The dog clutch 112 and the synchronizer 124 may engage with any suitable portion of the second mechanical pump 110. For example, the dog clutch 112 and the synchronizer 124 may engage with the inner gears 144 of the second mechanical pump 110.

Figure 2:
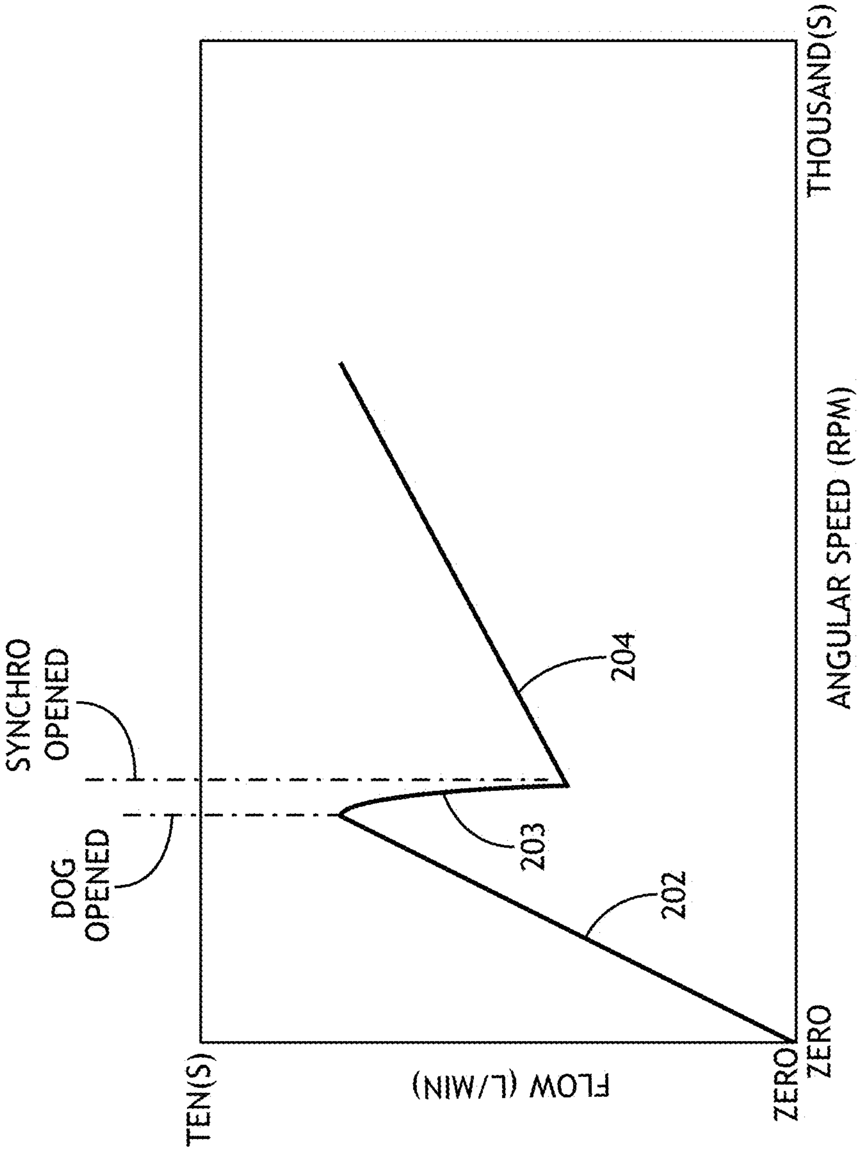
FIG. 2 illustrates a graph of a pumped flow rate as a function of angular speed for the dual oil pump, in accordance with one or more embodiments of the present disclosure.

FIG. 2 illustrates a graph 200, in accordance with one or more embodiments of the present disclosure. The graph 200 depicts the flow of the oil 103 being pumped at the outlet in liters/minute (L/min) as a function of the angular speed in revolution-per-minute (RPM) of the pump shaft 106. The graph 200 illustrates the clutch-closed stage 202, the synchro stage 203, and the clutch-open stage 204.

The flow of the oil 103 being pumped in the clutch-closed stage 202 may increase linearly as the angular speed of the pump shaft 106 increases up to the point at which the dog clutch 112 is opened. The flow of the oil 103 being pumped in the synchro stage 203 may decrease (e.g., linearly or non-linearly) as the angular speed of the pump shaft 106 increases from the point at which the dog clutch 112 is opened to the point at which the synchronizer 124 is opened. The decrease in flow may be due to the second mechanical pump 110 being gradually disengaged by slipping of the synchronizer 124. The flow of the oil 103 being pumped in the clutch-open stage 204 at the point at which the synchronizer 124 is opened may be about half of the flow of the oil 103 being pumped in the clutch-closed stage 202 at the point at which the dog clutch 112 is opened, due to the second mechanical pump 110 being disengaged. The flow of the oil 103 being pumped in the clutch-open stage 204 may increase linearly as the angular speed of the pump shaft 106 increases from the point at which the synchronizer 124 is opened. The linear rate of increase in the clutch-open stage 204 may be half of the linear rate of increase in the clutch-closed stage 202, because only the first mechanical pump 108 is pumping in the clutch-open stage 204 while both the first mechanical pump 108 and the second mechanical pump 110 are pumping in the clutch-closed stage 202. The rate of the flow increase provided by the clutch-closed stage 202 may be beneficial to rapidly increase the flow rate at lower-RPMs up to a target flowrate to provide a desired cooling capacity, while decreasing the rate of the flow increase provided by the clutch-open stage 204 at higher RPMs reducing the wear and work on the dual oil pump 100. Thus, the dual oil pump 100 may provide extra cooling using the second mechanical pump 110 at low angular speeds and disengage the second mechanical pump 110 at higher speeds for improved efficiency.

As may be understood, the specific values of the flow and the angular speed is not intended to be limiting in the graph 200. The flow of the oil 103 being pumped may be on the order of single digit or tens of liters/minute when the angular speed of the pump shaft 106 is on the order of thousands of revolutions-per-minute. As an example, the point at which the dog clutch 112 and/or the synchronizer 124 are opened may be between 2000 and 3000 RPM. The flow of the oil 103 being pumped from the outlet 116 in the clutch-closed stage 202 immediately before the point at which the dog clutch 112 is opened may be between 12 and 16 L/min. Similarly, the flow of the oil 103 being pumped from the outlet 116 in the clutch-open stage 204 immediately after the point at which the synchronizer 124 is opened may be between 6 and 9 L/min. The dual oil pump 100 may also reach the target flow rate of between 6 and 9 L/min at half the RPM (e.g., between about 1000 and 1500 RPM) in the clutch-closed stage 202. The dual oil pump 100 may maintain the maximum flow rate at or below 20 L/min between 5000 and 6000 RPM.

Figure 3:
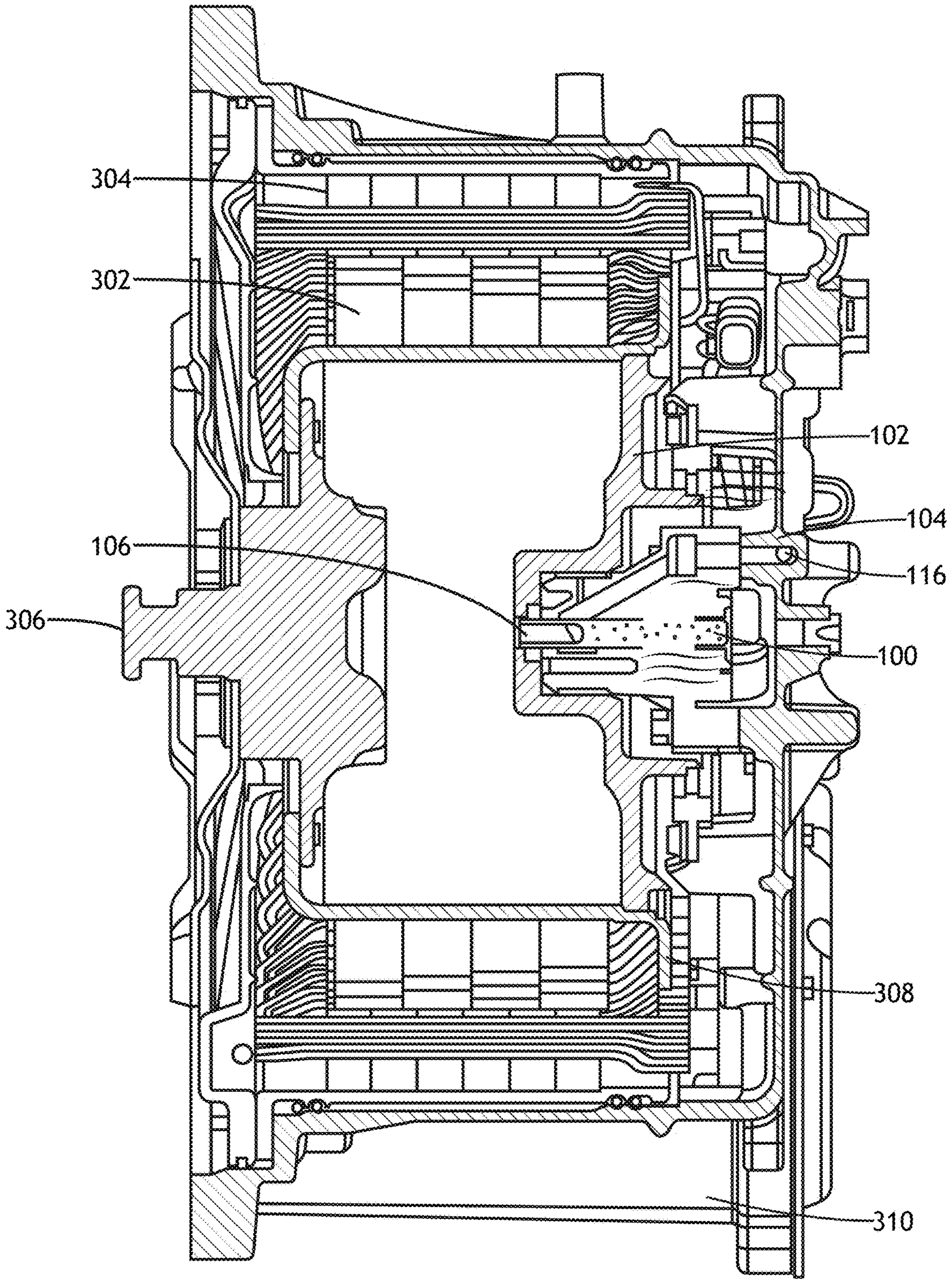
FIG. 3 illustrates a cross-section view along a center axis of a dynamo-electric machine with the dual oil pump, in accordance with one or more embodiments of the present disclosure.

FIG. 3 illustrates a dynamo-electric machine 300, in accordance with one or more embodiments of the present disclosure. Dynamo-electric refers to the conversion of mechanical energy to electrical energy or vice versa by electromagnetic means. The dynamo-electric machine 300 may be a generator (e.g., a series-hybrid generator), a motor (e.g., a starter motor, a motor assist module), a hybrid module (e.g., a P0 hybrid module, a P1 hybrid module), or the like. The dynamo-electric machine 300 may be used for various applications such as internal combustion vehicles, hybrid electric vehicles (HEVs), the like. The dynamo-electric machine 300 may include one or more components, such as, but not limited to, the dual oil pump 100, a rotor 302, a stator 304, an input shaft 306, a rotor carrier 308, and/or a sump 310.

The rotor 302 and the stator 304 may form a radial flux machine. The rotor 302 and the stator 304 may form an outer-rotor, inner-stator radial flux machine. For example, the rotor 302 may be disposed radially outwards of and axially aligned with the stator 304. The rotor 302 may be configured to rotate relative to the stator 304 about the center axis 101. The rotor 302 and the stator 304 may be magnetically coupled via a radial flux magnetic field. For example, the rotor 302 may be configured to generate electricity in response to the magnetic field induced by rotation of the rotor 302 relative to the stator 304, such that the dynamo-electric machine 300 is configured as a generator. By way of another example, the rotation of the rotor 302 may be driven by a magnetic field induced by the rotor 302 receiving a supply of electricity, such that the dynamo-electric machine 300 is configured as a motor. The rotor 302 may be radially supported at one or both axial ends.

The rotor 302, the input shaft 306, the rotor carrier 308, and the carrier assembly 104 may form a rigid body. The rotor 302, the input shaft 306, the rotor carrier 308, and the carrier assembly 104 may be coupled with zero degrees-of-freedom. The rotor carrier 308 may couple between the input shaft 306, the rotor 302, and the carrier assembly 104.

The dual oil pump 100 may pump the oil 103 via the rotation of the pump shaft 106. The rotation of the pump shaft 106 may be driven via the rotor carrier 308 and the carrier assembly 104. For example, the dynamo-electric machine 300 which is configured as the generator may drive the rotation of the rotor 302 via the input shaft 306 and the rotor carrier 308, and may also drive the rotation of the pump shaft 106 via the input shaft 306, the rotor carrier 308, and the carrier assembly 104. The input shaft 306 of the generator may provide an adaption for driving the rotation of the rotor 302 and/or the pump shaft 106. By way of another example, the dynamo-electric machine 300 which is configured as the motor may drive the rotation of the input shaft 306 via the rotor 302 and the rotor carrier 308, and may also drive the rotation of the pump shaft 106 via the rotor 302, the rotor carrier 308, and the carrier assembly 104.

The dual oil pump 100 may pump the oil 103 from the sump 310 via the inlet 114. The inlet 114 may be formed as one or more tubes which extend radially downwards from the dual oil pump 100 into the sump 310. The dual oil pump 100 may then suction the oil 103 from the sump 310.

The dual oil pump 100 may be configured to pump the oil 103 for the purpose of cooling and/or lubricating the dynamo-electric machine 300. For example, the dual oil pump 100 may pump the oil 103 for the purpose of cooling the stator 304. The dual oil pump 100 may pump the oil 103 along an outer radius of the stator 304 via the outlet 116 for cooling the stator 304. By way of another example, the dual oil pump 100 may also be configured to pump the oil 103 along the center axis of the pump shaft 106 and spray onto the inner diameter of the rotor 302 for the purpose of lubrication.

The system housing 132 may house the various components of the dynamo-electric machine 300. For example, the system housing 132 may house the rotor 302, the stator 304, the input shaft 306, the rotor carrier 308, the sump 310, and the like.

The system housing 132 may include an arrangement for cooling or ventilating the dynamo-electric machine 300 with a closed casing and closed-circuit cooling using the oil 103. The flow of the oil 103 in the dynamo-electric machine 300 may be a closed-circuit and may be maintained within the system housing 132. For example, the oil 103 may return to the sump 310 after receiving heat from the stator 304. The oil 103 may flow through one or more heat-exchangers (not depicted) to shed the heat received from the stator 304 before returning to the sump 310. By way of another example, the oil 103 may return to the sump 310 after lubricating the rotor 302.

Referring generally again to the figures. The spring rate of the shaft-return spring 122, mass of the centrifugal rollers 118, the number of the centrifugal rollers 118, and/or slope of the ramped surface 156 may be balanced to tune the angular speed at which the dog clutch 112 is opened/closed. Similarly, the spring rate of the synchro-return spring 142 and/or the length of travel of the synchro-return spring 142 may be balanced to tune the angular speed at which the synchronizer 124 is opened/closed.

Radial bearings may refer to any bearing which may bear a radial load. Similarly, thrust bearings may refer to any bearing which may bear an axial load. The radial bearings and/or the thrust bearings may include plain bearings (e.g., bushings), ball bearings, roller bearings, or the like.

As used herein, the term "axial" and derivatives thereof, such as "axially," shall be understood to refer to a direction along the axis. The term "coaxial" shall be understood to refer to a common axis. Further, the term "radial" and derivatives thereof, such as "radially," shall be understood in relation to the axis. For example, "radially outward" refers to further away from the axis, while "radially inward" refers to nearer to the axis. The term "circumference" or derivatives thereof, such as "circumferentially", may also be defined in reference to the center axis.

A "non-rotatable connection" and derivatives thereof, such as "non-rotatably connected," between first and second components may mean that the first component is connected to the second component so that any time the first component rotates, the second component rotates with the first component, and any time the second component rotates, the first component rotates with the second component. Axial displacement between the first and second components is possible. For example, the non-rotatable connection may be a prismatic joint permitting relative axial translation.

A "rotatable connection" and derivatives thereof, such as "rotatably connected," between first and second components may mean that the first component is connected to the second component so that the first component may rotate relative to the second component, and the second component may rotate relative to the first component. Axial displacement between the first and second components is possible. For example, the rotatable connection may be a cylindrical joint permitting relative rotation and relative axial translation. By way of another example, the rotatable connection may be a revolute joint permitting relative rotation but not permitting relative axial translation.

A prismatic joint may be a one-degree-of-freedom joint. The prismatic joint between a first component and a second component may permit the first component to axially translate relative to the second component, and vice versa, but may permit no other relative translation or relative rotation therebetween. The prismatic joint may include any suitable prismatic joint, such as, but not limited to, polygonal joint (e.g., a square joint, a hexagonal joint), a stadium joint, a D-joint, a keyed joint, a floating spline joint, a dovetail slide, a linear bearing, or the like.

A revolute joint may be a one-degree-of-freedom joint. The revolute joint between a first component and a second component may permit the first component to rotate relative to the second component, and vice versa, but may permit no relative translation therebetween.

A cylindrical joint may be a two-degree-of-freedom joint. The cylindrical joint between a first component and a second component may permit the first component to rotate relative to the second component and may permit the first component to axially translate relative to the second component, and vice versa.

A dynamo-electric machine may be a three-phase machine. The three-phase machine may carry three phases of current, including first-phase (u), second-phase (v), and third-phase (w). The windings of an electro-magnet rotor may carry respective of the phases to define poles of the magnetic field. The windings may include first-phase windings, second-phase windings, and third-phase windings. The first-phase windings, second-phase windings, and third-phase windings may be arranged in an alternating arrangement. The windings may form a "wye" transformer or the like. The windings may include one or more of the first-phase windings, second-phase windings, and third-phase windings per pole-group. For example, the windings may include a two-layer winding, a four-layer winding, and the like. Permanent-magnet rotors may include permanent magnets which are radially aligned with and magnetically couple to the windings.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 dual oil pump
101 center axis
102 housing assembly
103 oil
104 carrier assembly
106 pump shaft
108 first mechanical pump
110 second mechanical pump
112 dog clutch
114 inlet
116 outlet
118 centrifugal rollers
120 single-bar linkages
122 shaft-return spring
124 synchronizer
126 check valve
128 bearing carrier
130 pump drive
132 system housing
134 back housing
136 intermediate housing
138 front housing
140 radial bearing
142 synchro-return spring
144 inner gears
146 outer gears
148 shaft-to-carrier prismatic joint
150 shaft-to-linkage revolute joints
152 roller-to-linkage revolute joints
154 shaft-to-pump prismatic joint
156 ramped surface
158 shoulder portion
160 dog teeth
162 shaft-to-sychro prismatic joint
200 graph
202 clutch-closed stage
203 synchro stage
204 clutch-open stage
300 dynamo-electric machine
302 rotor
304 stator
306 input shaft
308 rotor carrier
310 sump

What is claimed:

1. A dual oil pump comprising:

a housing assembly, the housing assembly defining an inlet and an outlet;

a carrier assembly, the carrier assembly being rotatably connected to the housing assembly;

a pump shaft, the pump shaft being non-rotatably connected to and configured to axially translate relative to the carrier assembly;

a first mechanical pump, the pump shaft being non-rotatably connected to and configured to axially translate relative to the first mechanical pump;

a second mechanical pump, the first mechanical pump and the second mechanical pump being radially aligned and axially offset from each other, the first mechanical pump and the second mechanical pump being disposed axially within and radially within the housing assembly, the first mechanical pump and the second mechanical pump being configured to pump oil from the inlet to the outlet via rotation of respective of the first mechanical pump and the second mechanical pump relative to the housing assembly; and a dog clutch, the dog clutch being formed by the pump shaft and the second mechanical pump, the dog clutch being a non-rotatable connection between the pump shaft and the second mechanical pump when closed and permitting relative rotation between the pump shaft and the second mechanical pump when open, the dog clutch being closed and opened by axial translation of the pump shaft relative to the second mechanical pump, the pump shaft being configured to axially translate relative to the housing assembly, the carrier assembly, the first mechanical pump, and the second mechanical pump via centrifugal shifting caused by rotation of the carrier assembly and the pump shaft about a center axis.

2. The dual oil pump of claim 1, wherein the housing assembly is formed of a back housing, an intermediate housing, and a front housing, wherein the back housing, the intermediate housing, and the front housing are radially aligned, wherein the intermediate housing is axially disposed between the back housing and the front housing, wherein the intermediate housing defines the inlet and the outlet, wherein the first mechanical pump is disposed axially between the front housing and the intermediate housing, wherein the second mechanical pump is disposed axially between the intermediate housing and the back housing.

3. The dual oil pump of claim 2, wherein the carrier assembly is formed of a bearing carrier and a pump drive, wherein the bearing carrier and the pump drive are radially aligned and affixed together, wherein the dual oil pump comprises a radial bearing, wherein the bearing carrier of the carrier assembly is rotatably connected to the front housing of the housing assembly via the radial bearing, wherein a shaft-to-carrier prismatic joint is formed between the pump shaft and the pump drive.

4. The dual oil pump of claim 1, wherein the inlet and the outlet split between the first mechanical pump and the second mechanical pump, wherein the dual oil pump comprises a check valve, wherein the check valve is coupled along the inlet to the second mechanical pump.

5. The dual oil pump of claim 1, wherein the first mechanical pump and the second mechanical pump are at least one of gear pumps or rotary lobe pumps.

6. The dual oil pump of claim 5, wherein the first mechanical pump and the second mechanical pump are the gear pumps, wherein the first mechanical pump and the second mechanical pump are at least one of external gear pumps or internal gear pumps.

7. The dual oil pump of claim 6, wherein the first mechanical pump and the second mechanical pump are the internal gear pumps, wherein the first mechanical pump and the second mechanical pump comprise inner gears and outer gears, wherein the inner gears are axially aligned with and disposed radially inwards of the outer gears, wherein the inner gears mesh with the outer gears, wherein the inner gears and the outer gears are configured to rotate relative to the housing assembly, wherein a shaft-to-pump prismatic joint is formed between the pump shaft and the inner gear of the first mechanical pump, wherein the dog clutch is formed by dog teeth disposed on an axial end of the pump shaft and disposed on the inner gear of the second mechanical pump.

8. The dual oil pump of claim 1, wherein the carrier assembly defines a ramped surface, wherein the ramped surface increases radially away from the center axis when the ramped surface is further axially from the housing assembly, wherein the dual oil pump comprises:

a centrifugal roller, wherein the ramped surface is disposed radially outwards of and axially aligned with the centrifugal roller, wherein the centrifugal roller is configured to abut with and roll on the ramped surface; and a single-bar linkage, wherein the single-bar linkage couples between the pump shaft and the centrifugal roller.

9. The dual oil pump of claim 8, wherein the centrifugal roller is one of a plurality of centrifugal rollers, wherein the single-bar linkage is one of a plurality of single-bar linkages.

10. The dual oil pump of claim 8, wherein the single-bar linkage is coupled to and configured to rotate relative to the pump shaft perpendicular to the center axis, wherein the centrifugal roller is coupled to and configured to rotate relative to the single-bar linkage perpendicular to the center axis, wherein the pump shaft and the centrifugal roller are coupled to opposing ends of the single-bar linkage.

11. The dual oil pump of claim 10, wherein rotation of the pump shaft about the center axis causes the centrifugal roller to translate radially up to and in abutment with the ramped surface via centrifugal force, wherein the centrifugal roller is configured to roll along the ramped surface by rotating relative to the single-bar linkage as the single-bar linkage rotates relative to the pump shaft and the pump shaft translates axially.

12. The dual oil pump of claim 10, wherein the ramped surface comprises one of a convex slope, a linear slope, or a concave slope.

13. The dual oil pump of claim 10, wherein the centrifugal roller does not rotate relative to the ramped surface about the center axis.

14. The dual oil pump of claim 8, comprising a shaft-return spring, wherein the dog clutch is normally-closed by the shaft-return spring, wherein the shaft-return spring is coupled between the carrier assembly and the pump shaft.

15. The dual oil pump of claim 14, wherein the pump shaft comprises a shoulder portion, wherein the shaft-return spring is coupled between a pump drive of the carrier assembly and the shoulder portion of the pump shaft, wherein the single-bar linkage is coupled to the shoulder portion.

16. The dual oil pump of claim 1, wherein the dual oil pump is configured to synchronize the second mechanical pump to an angular speed of the pump shaft before the dog clutch is closed.

17. The dual oil pump of claim 16, comprising:

a synchronizer, wherein the synchronizer is disposed radially inwards of and axially aligned with the dog clutch, wherein the synchronizer is non-rotatably connected to and configured to axially translate relative to the pump shaft, wherein the synchronizer is configured to synchronize the second mechanical pump to the angular speed of the pump shaft; and a synchro-return spring, wherein the synchronizer is normally-closed by the synchro-return spring, wherein the synchro-return spring is coupled between the pump shaft and the synchronizer.

18. A dynamo-electric machine comprising:

a dual oil pump comprising:

a housing assembly, the housing assembly defining an inlet and an outlet;

a carrier assembly, the carrier assembly being rotatably connected to the housing assembly;

a pump shaft, the pump shaft being non-rotatably connected to and configured to axially translate relative to the carrier assembly;

a first mechanical pump, the pump shaft being non-rotatably connected to and configured to axially translate relative to the first mechanical pump;

a second mechanical pump, the first mechanical pump and the second mechanical pump being radially aligned and axially offset from each other, the first mechanical pump and the second mechanical pump being disposed axially within and radially within the housing assembly, the first mechanical pump and the second mechanical pump being configured to pump oil from the inlet to the outlet via rotation of respective of the first mechanical pump and the second mechanical pump relative to the housing assembly; and a dog clutch, the dog clutch being formed by the pump shaft and the second mechanical pump, the dog clutch being a non-rotatable connection between the pump shaft and the second mechanical pump when closed and permitting relative rotation between the pump shaft and the second mechanical pump when open, the dog clutch being closed and opened by axial translation of the pump shaft relative to the second mechanical pump, the pump shaft being configured to axially translate relative to the housing assembly, the carrier assembly, the first mechanical pump, and the second mechanical pump via centrifugal shifting caused by rotation of the carrier assembly and the pump shaft about a center axis;

a rotor;

a stator, the rotor and the stator forming an outer-rotor, inner-stator radial flux machine;

an input shaft; and a rotor carrier, the rotor, the input shaft, the rotor carrier, and the carrier assembly forming a rigid body.

19. The dynamo-electric machine of claim 18, wherein the dynamo-electric machine is configured as a generator, wherein the generator drives the rotation of the rotor via the input shaft and the rotor carrier, wherein the generator drives the rotation of the pump shaft via the input shaft, the rotor carrier, and the carrier assembly.

20. The dynamo-electric machine of claim 18, wherein the dynamo-electric machine is configured as a motor, wherein the motor drives the input shaft via the rotor and the rotor carrier, wherein the motor drives the rotation of the pump shaft via the rotor, the rotor carrier, and the carrier assembly.

* * * * *